United States Patent
Kulkarni et al.

(10) Patent No.: US 11,455,282 B1
(45) Date of Patent: Sep. 27, 2022

(54) SYSTEM FOR QUEUING BACKUP OPERATIONS IN A DEDUPLICATING STORAGE SYSTEM

(71) Applicant: EMC IP Holding Company LLC, Hopkinton, MA (US)

(72) Inventors: Gururaj Kulkarni, Bangalore (IN); Manjunatha Hebbar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1153 days.

(21) Appl. No.: 14/102,111

(22) Filed: Dec. 10, 2013

(51) Int. Cl.
*G06F 16/21* (2019.01)

(52) U.S. Cl.
CPC .................... *G06F 16/21* (2019.01)

(58) Field of Classification Search
CPC ............. G06F 11/1469; G06F 11/1458; G06F 11/1451
USPC .......................................... 707/654
See application file for complete search history.

(56) References Cited

U.S. PATENT DOCUMENTS

| | | | | |
|---|---|---|---|---|
| 7,539,710 B1 * | 5/2009 | Haustein | ........... | G06F 16/90344 |
| 8,112,505 B1 * | 2/2012 | Ben-Shaul | .......... | G06F 16/1767 709/219 |
| 8,849,878 B1 * | 9/2014 | Bachu | ..................... | G06F 16/00 707/823 |
| 2013/0139172 A1 * | 5/2013 | An | ........................ | G06F 9/5005 718/104 |
| 2014/0114932 A1 * | 4/2014 | Mallaiah | ................. | G06F 3/067 707/E17.032 |
| 2014/0122818 A1 * | 5/2014 | Hayasaka | ........... | G06F 16/1748 711/162 |
| 2014/0304239 A1 * | 10/2014 | Lewis | ................... | G06F 3/0608 707/692 |
| 2015/0134623 A1 * | 5/2015 | Liu | ..................... | G06F 11/1453 707/692 |

* cited by examiner

*Primary Examiner* — Hosain T Alam
*Assistant Examiner* — Robert F May
(74) *Attorney, Agent, or Firm* — Krishnendu Gupta; Nikhil Patel (57) ABSTRACT

A system for queuing deduplication backup operations comprises an input interface and a processor. The input interface configured to receive a request to perform a deduplication backup operation. The processor is configured to: a) determine a backup operation queue; b) determine whether the deduplication backup operation is at the head of the backup operation queue; c) determine whether the deduplication backup operation is qualified to be executed; and d) in the event the deduplication backup operation is qualified to be executed, execute the deduplication backup operation.

26 Claims, 6 Drawing Sheets

SYSTEM FOR QUEUING BACKUP OPERATIONS IN A DEDUPLICATING STORAGE SYSTEM

BACKGROUND OF THE INVENTION

An enterprise backup software system comprises many backup clients to protect backup data. A deduplicating backup server efficiently stores backup copies of data by segmenting data and storing data segments only once regardless of the number of times they appear on the client systems. Communication between client side backup software and a deduplicating backup server can be insufficient for the backup software to determine when it is an appropriate time to deliver a backup job or why a backup job took longer than expected.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for queuing backup operations in a deduplicating storage system is disclosed. A system for queuing deduplication backup operations comprises an input interface configured to receive a request to perform a deduplication backup operation. The system for queuing deduplication backup operations additionally comprises a processor configured to determine a backup operation queue; determine whether the deduplication backup operation is at the head of the backup operation queue; determine whether the deduplication backup operation is qualified to be executed; and in the event that the deduplication backup operation is qualified to be executed, execute the deduplication backup operation. The system for queuing deduplication backup operations additionally comprises a memory coupled to the processor and configured to provide the processor with instructions.

A system for queuing backup operations in a deduplicating storage system coordinates the operations of the deduplicating storage system. Client backup software is used to back up the client data on to the deduplicating storage system. Many clients can use a deduplicating storage system for backup and restore; maintenance operations can be requested by the backup server or by the storage system itself. The client does not know the load on the storage system at any given time, so it is difficult to predict the performance of a backup system operation (e.g., determine the expected time to complete a backup or recovery operation) or determine why the performance of a backup system operation differed from the prediction. The system for queuing backup operations logs requests for backup system operations and completions of backup system operations in order to maintain better records of the client requests to the backup system. The system for queuing backup operations additionally maintains backup operations queues in order to avoid performing an operation when the system is already overloaded. In various embodiments, the system is checked for overloading by: looking at the number of input streams being processed (e.g., to see if the number exceeds a threshold), looking at the processor loading (e.g., to see if the loading is too high to accept another job or task or sufficiently low to be able to accept another job or task), looking at the disk access loading (e.g., to see if the disk access is already being over taxed), or any other appropriate system check.

Figure 1:
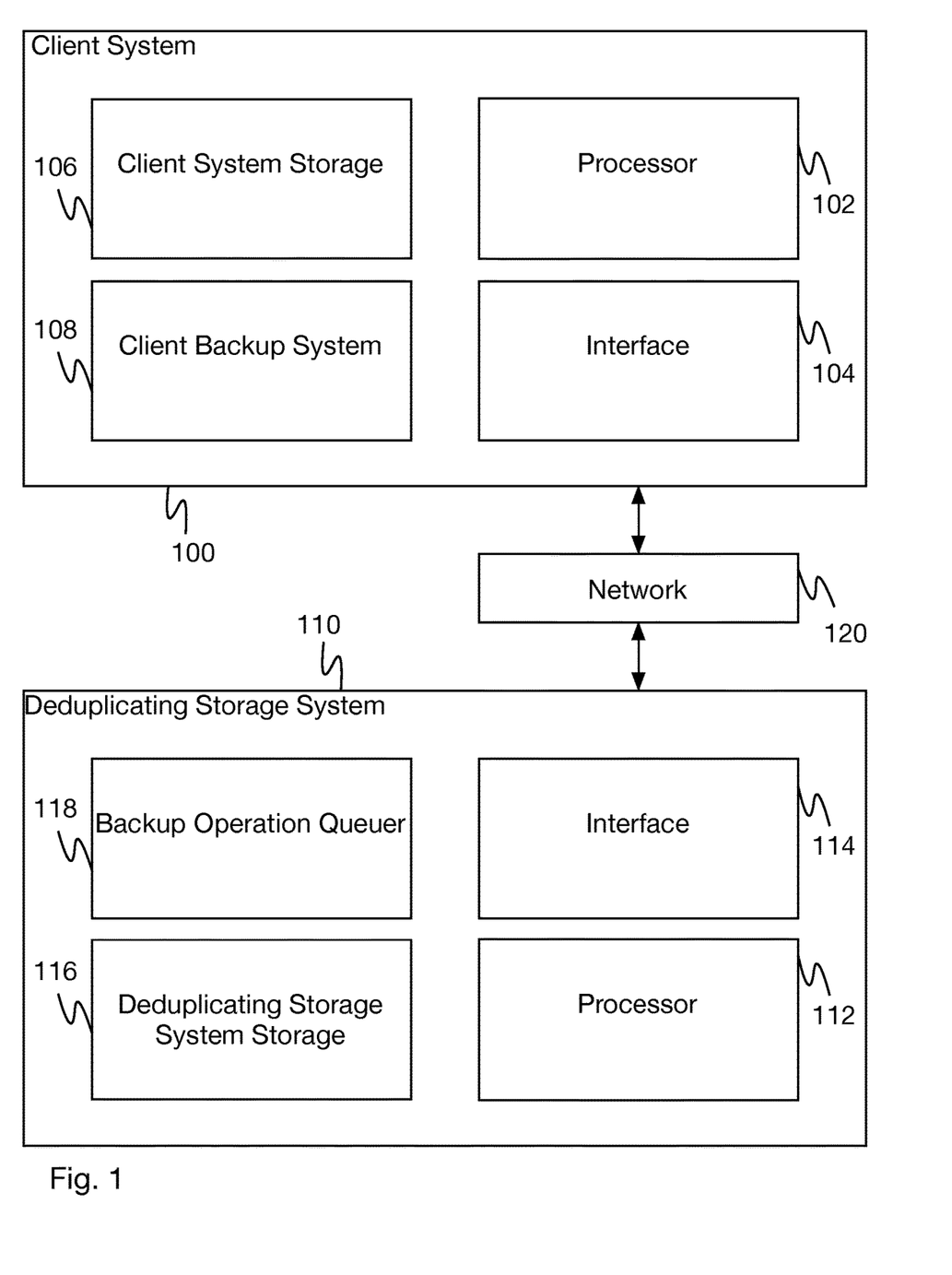
FIG. 1 is a block diagram illustrating an embodiment of a system for queuing backup operations in a deduplicating storage system.

FIG. 1 is a block diagram illustrating an embodiment of a system for queuing backup operations in a deduplicating storage system. In the example shown, the system for queuing backup operations in a deduplicating storage system comprises client system 100 communicating with deduplicating storage system 110. In some embodiments, client system 100 communicates with deduplicating storage system 110 via network 120. In various embodiments, network 120 comprises one or more of the following: a local area network, a wide area network, a wired network, a wireless network, the Internet, an intranet, a storage area network, or any other appropriate communication network. Client system 100 comprises a client system (e.g., a computing system for operation by a user). In some embodiments, client system 100 comprises a system accessed by a user directly (e.g., the user is in proximity with client system 100). In some embodiments, client system 100 comprises a system accessed by a user remotely (e.g., the user is not in proximity with client system 100, and accesses client system 100 via network 120 and a separate user system). Client system 100 comprises a system running enterprise software (e.g., business software for creating data, storing data, transmitting data, receiving data, etc.) using processor 102. Client system 100 communicates with network 120 using interface 104 and stores data using client system storage 106. In some embodiments, client backup system 108 comprises a system for storing data on a backup system or retrieving stored data from the backup system. In some embodiments, client backup system 108 comprises software running on processor 102. Deduplicating storage system 110 comprises a computer system for storing deduplicated data. In some embodiments, deduplicated data comprises data processed in such a way that multiple copies of the same data are only stored once (e.g., a file is stored as a series of pointers to segments, where a segment can be used to reconstruct more than one file, and where segment endpoints are determined using a function (e.g., a hash function) and the data in the file). In some embodiments, deduplicating storage system 110 comprises a system for storing backup copies of data (e.g., a system for storing backup copies of data from client system 100). Processor 112 comprises a processor for controlling operations of deduplicating storage system 110. Deduplicating storage system 110 additionally comprises interface 114 for communicating with network 120 and deduplicating storage system storage 116 for storing data. Backup operation queuer 118 comprises a queuer (e.g., a system for maintaining queues) for queuing backup operations. In various embodiments, backup operation queuer 118 comprises a queuer for queuing backup storage operations, backup recovery operations, backup maintenance operations, or any other appropriate backup operations. In some embodiments, backup operation queuer 118 comprises software running on processor 112. In some embodiments, there are N client systems and M deduplicating storage systems that are capable of communicating with each other via a network.

Figure 2:
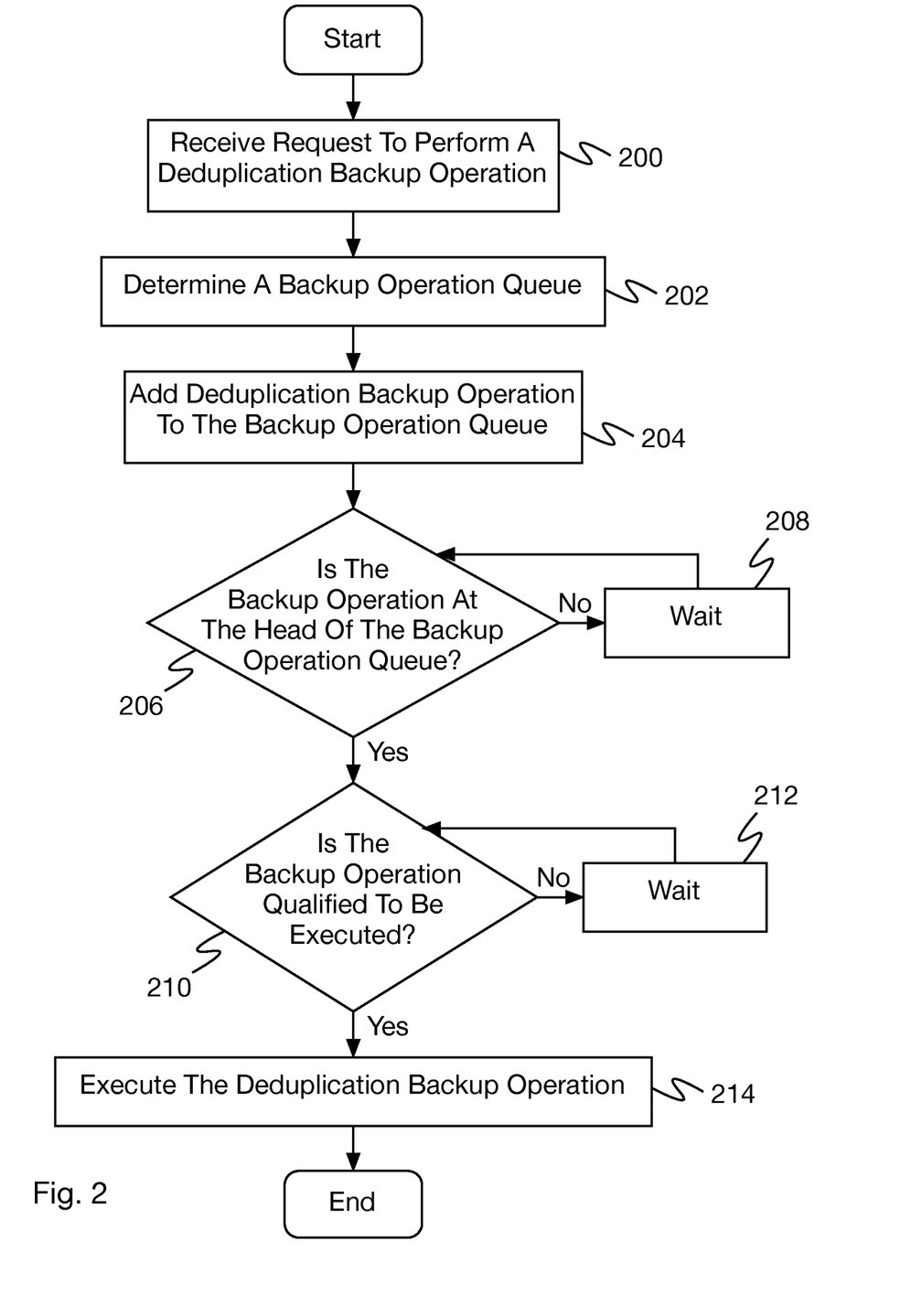
FIG. 2 is a flow diagram illustrating an embodiment of a process for queuing a backup operation.

FIG. 2 is a flow diagram illustrating an embodiment of a process for queuing a backup operation. In some embodiments, the process of FIG. 2 is executed by backup operation queuer 118 of FIG. 1. In the example shown, in 200, a request to perform a deduplication backup operation is received. In various embodiments, a deduplication backup operation comprises a backup storage operation, a backup maintenance operation, a backup recovery operation, or any other appropriate backup operation. In some embodiments, the request to perform a deduplication backup operation is logged (e.g., an indication is made to a system log that the request to perform the deduplication backup operation has been received). In 202, a backup operation queue is determined. In some embodiments, a backup operation queue is determined corresponding to the type of backup operation received in 200 (e.g., a backup storage operation queue is determined for a backup storage operation, a backup maintenance operation queue is determined for a backup maintenance operation, a backup recovery operation queue is determined for a backup recovery operation, etc.). In some embodiments, multiple types of operations are queued together (e.g., backup storage operations and backup recovery operations are queued in a single queue). In 204, the deduplication backup operation is added to the backup operation queue. In some embodiments, the deduplication backup operation is added to the end of the queue. In some embodiments, the deduplication backup operation is added to a point in the queue based at least in part on a deduplication backup operation priority. In 206, it is determined whether the backup operation is at the head of the backup operation queue. If it is determined in 206 that the backup operation is not at the head of the backup operation queue, control passes to 208. In 208, the process waits. In various embodiments, the process waits for 1 millisecond, 10 milliseconds, 500 milliseconds, 2 seconds, 10 seconds, 1 minute, or any other appropriate period of time. Control then passes to 206. If it is determined in 206 that the backup operation is at the head of the backup operation queue, control passes to 210. In 210, it is determined whether the backup operation is qualified to be executed. In some embodiments, it is determined whether the backup operation is qualified to be executed based at least in part on a load threshold. In various embodiments, a load threshold comprises an input stream load threshold, a processor load threshold, a storage load threshold, or any other appropriate load threshold. If it is determined in 210 that the backup operation is not qualified to be executed, control passes to 212. In 212, the process waits. In various embodiments, the process waits for 1 millisecond, 10 milliseconds, 500 milliseconds, 2 seconds, 10 seconds, 1 minute, or any other appropriate period of time. Control then passes to 210. If it is determined in 210 that the backup operation is qualified to be executed, control passes to 214. In 214, the deduplication backup operation is executed.

Figure 3:
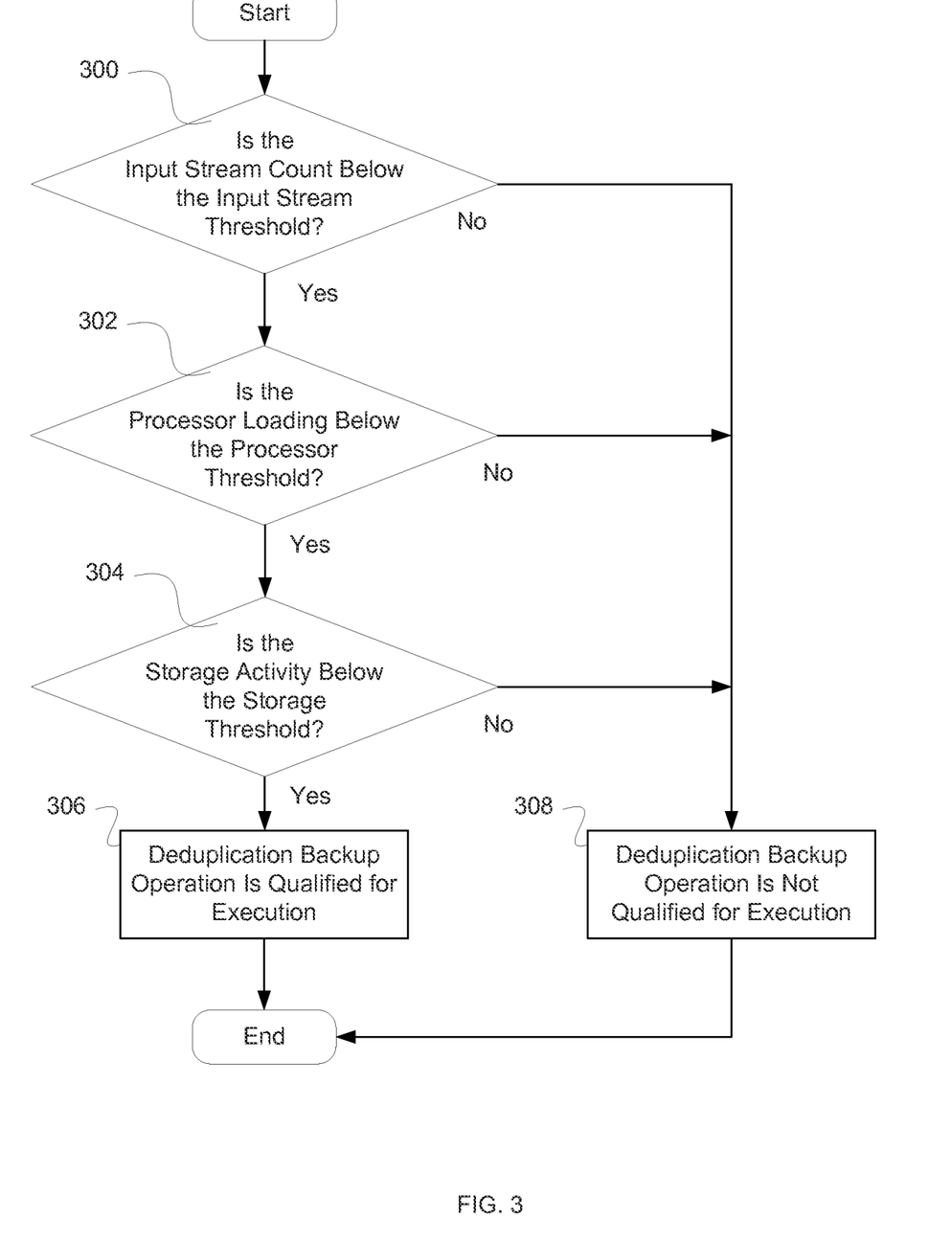
FIG. 3 is a flow diagram illustrating an embodiment of a process for determining if a backup operation is qualified to be executed.

FIG. 3 is a flow diagram illustrating an embodiment of a process for determining if a backup operation is qualified to be executed. In some embodiments, the process of FIG. 3 is executed by a deduplicating storage system (e.g., deduplicating storage system 110 of FIG. 1). In some embodiments, the process of FIG. 3 implements 210 of FIG. 2. In the example shown, in 300, it is determined whether the input stream bandwidth is below the input stream threshold. In some embodiments, an input stream threshold comprises a threshold on the data bandwidth received by the deduplicating storage system. In some embodiments, the input stream threshold is different for different deduplication backup operation types (e.g., the input stream threshold is different for backup storage operations and backup maintenance operations). If it is determined in 300 that the input stream number is not below the input stream threshold, control passes to 308. If it is determined in 300 that the input stream number is below the input stream threshold, control passes to 302. In 302, it is determined whether the processor loading is below the processor threshold. In some embodiments, the processor threshold comprises a threshold on the load of the deduplicating storage system processor. In some embodiments, the processor threshold is different for different deduplication backup operation types (e.g., the processor threshold is different for backup storage operations and backup maintenance operations). If it is determined in 302 that the processor loading is not below the processor threshold, control passes to 308. If it is determined in 302 that the processor loading is below the processor threshold, control passes to 304. In 304, it is determined whether the storage activity is below the storage threshold. In various embodiments, the storage threshold comprises a threshold on the total activity of the deduplicating storage system storage, on the write activity of the deduplicating storage system storage, on the read activity of the deduplicating storage system storage, or on any other appropriate deduplicating storage system storage activity. In some embodiments, the storage threshold is different for different deduplication backup operation types (e.g., the storage threshold is different for backup storage operations and backup maintenance operations). If it is determined in 304 that the storage activity is not below the storage threshold, control passes to 308. If it is determined in 304 that the storage activity is below the storage threshold, control passes to 306. In 306, it is reported that the deduplication backup operation is qualified for execution. The process then ends. In 308, it is reported that the deduplication backup operation is not qualified for execution. In various embodiments, the operation is qualified in the event that any one of the thresholds is satisfied, in the event that two of the three thresholds are satisfied, or any other appropriate serial/parallel or other combination or single qualification is satisfied.

Figure 4:
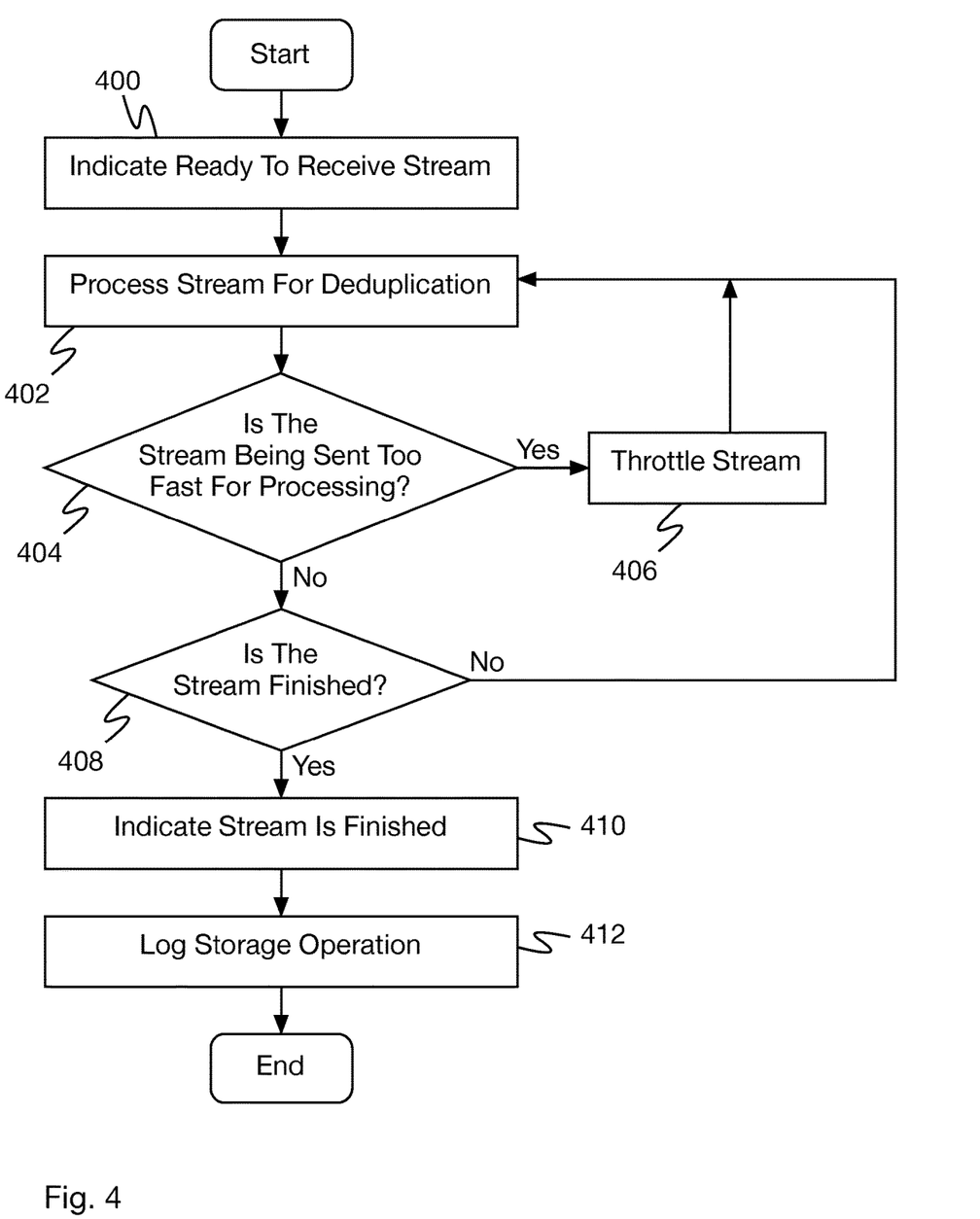
FIG. 4 is a flow diagram illustrating an embodiment of a process for executing a backup storage operation.

FIG. 4 is a flow diagram illustrating an embodiment of a process for executing a backup storage operation. In some embodiments, the process of FIG. 4 is executed by a deduplicating storage system (e.g., deduplicating storage system 110 of FIG. 1). In some embodiments, the process of FIG. 4 implements 214 of FIG. 2 in the event the deduplication backup operation comprises a backup storage operation. In the example shown, in 400, the deduplicating storage system indicates (e.g., to a client system—for example, client system 100 of FIG. 1) that it is ready to receive a stream (e.g., an input stream of data to store). In 402, the deduplicating storage system processes the stream for deduplication. In some embodiments, processing the stream for deduplication comprises segmenting the data stream. In some embodiments, processing the stream for deduplication comprises segmenting the data stream using a hash. In some embodiments, processing the stream for deduplication comprises determining a fingerprint associated with each data stream segment using a hash. In 404, it is determined whether the stream is being sent too fast for processing. If it is determined that the stream is being sent too fast for processing, control passes to 406. In 406, the stream is throttled (e.g., the deduplicating storage system makes an indication that the stream should be sent more slowly). Control then passes to 402. If it is determined in 404 that the stream is not being sent too fast for processing, control passes to 408. In 408, it is determined whether the stream is finished. If it is determined in 408 that the stream is not finished, control passes to 402. If it is determined in 408 that the stream is finished, control passes to 410. In 410, the deduplicating storage system indicates that the stream is finished. In 412, the deduplicating storage system logs the storage operation (e.g., makes an indication to a system log that the storage operation has been completed).

Figure 5:
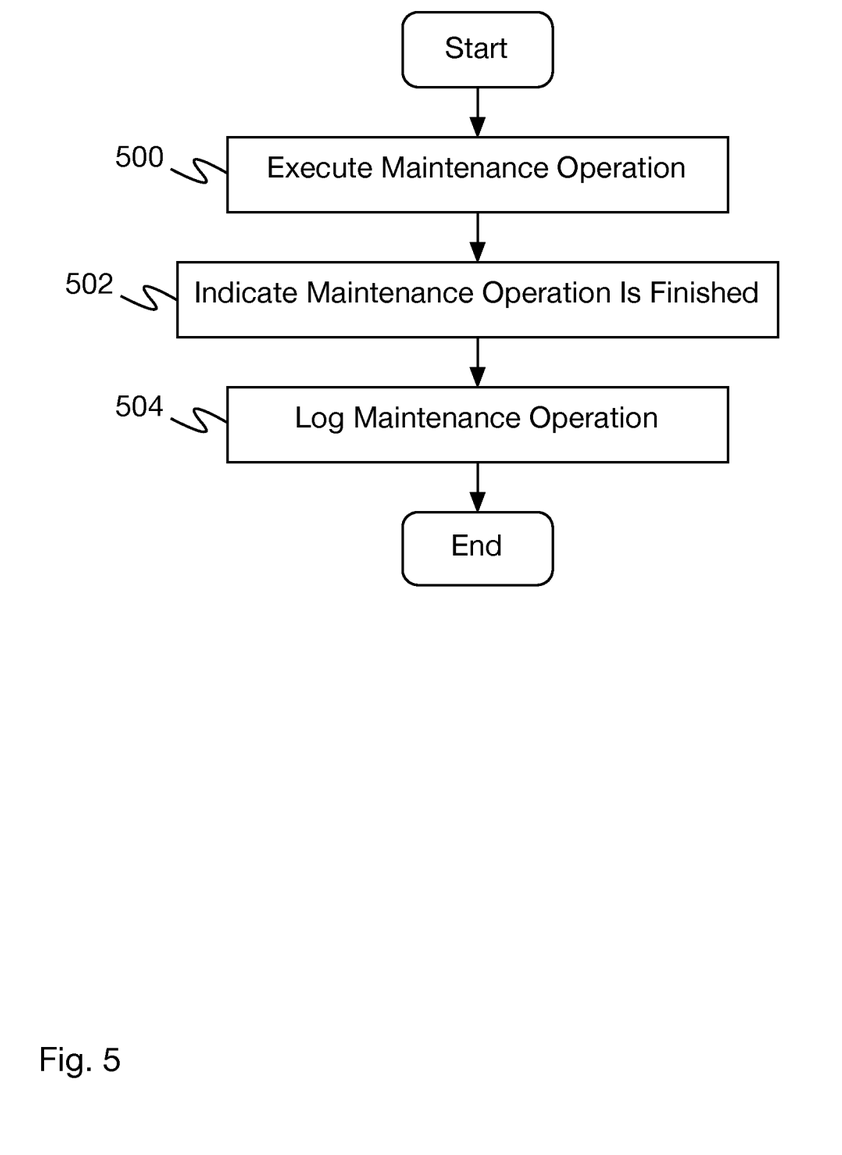
FIG. 5 is a flow diagram illustrating an embodiment of a process for executing a backup maintenance operation.

FIG. 5 is a flow diagram illustrating an embodiment of a process for executing a backup maintenance operation. In some embodiments, the process of FIG. 5 is executed by a deduplicating storage system (e.g., deduplicating storage system 110 of FIG. 1). In some embodiments, the process of FIG. 5 implements 214 of FIG. 2 in the event the deduplication backup operation comprises a backup maintenance operation. In some embodiments, a backup maintenance operation is internally request (e.g., requested by the deduplicating storage system) rather than received from a client system. In the example shown, in 500, the deduplicating storage system executes the maintenance operation. In some embodiments, executing the maintenance operation comprises deleting data (e.g., deleting outdated backup data). In 502, the deduplicating storage system indicates the maintenance operation is complete (e.g., indicates to the system requesting the maintenance operation that the maintenance operation is complete). In 504, the deduplicating storage system logs the maintenance operation (e.g., makes an indication to a system log that the maintenance operation has been completed).

Figure 6:
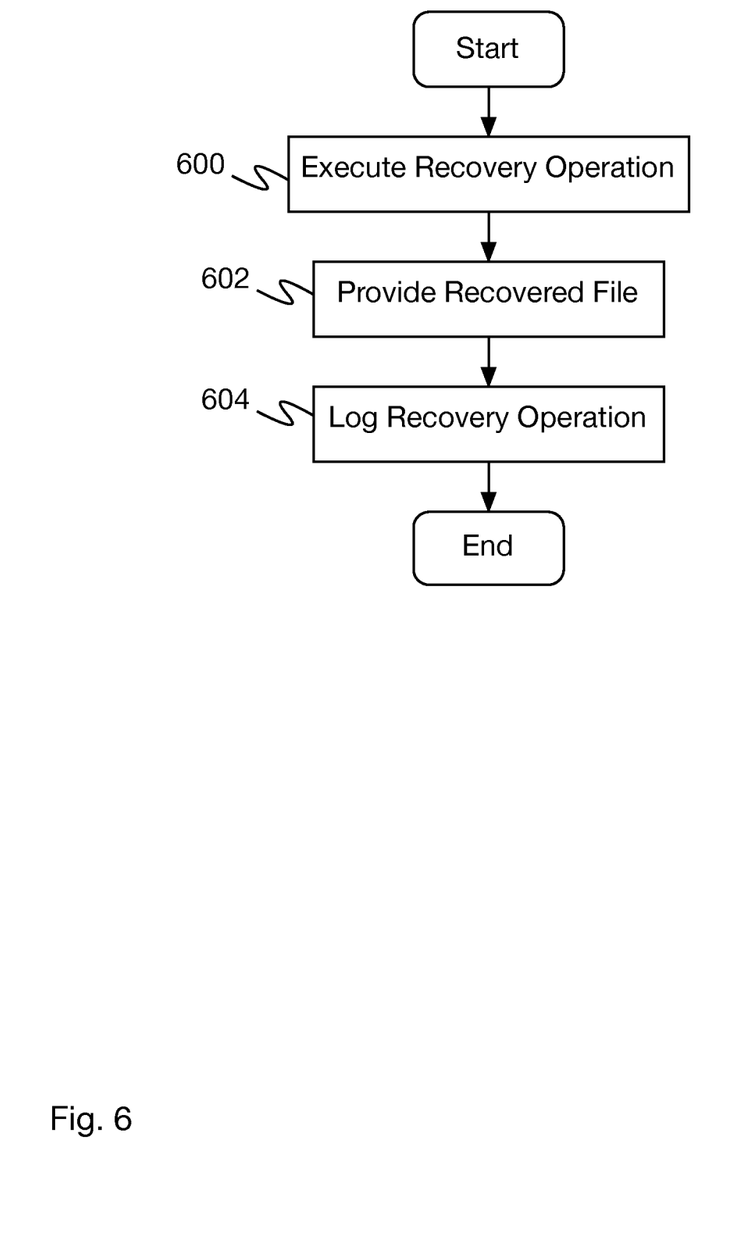
FIG. 6 is a flow diagram illustrating an embodiment of a process for executing a backup recovery operation.

FIG. 6 is a flow diagram illustrating an embodiment of a process for executing a backup recovery operation. In some embodiments, the process of FIG. 6 is executed by a deduplicating storage system (e.g., deduplicating storage system 110 of FIG. 1). In some embodiments, the process of FIG. 6 implements 214 of FIG. 2 in the event the deduplication backup operation comprises a backup recovery operation. In the example shown, in 600, the deduplicating storage system executes the recovery operation. In some embodiments, executing the recovery operation comprises recovering data (e.g., recovering backup data stored in a deduplicating storage system storage). In some embodiments, executing the recovery operation comprises assembling a data file stored as a deduplicated collection of data segments. In 602, the deduplicating storage system provides the recovered file (e.g., provides the recovered file to the client system requesting the recovery operation). In 604, the deduplicating storage system logs the recovery operation (e.g., makes an indication to a system log that the recovery operation has been completed).

In some embodiments, the system determines operations running (e.g., maintenance operations) by counting the number of operations that have been started and have not been completed (e.g., by processing the log information to count started operations that have not been completed).

In some embodiments, a backup application API (application programming interface) sends information regarding operations to a deduplication system which logs the operations into its log files.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for queuing deduplication backup operations, comprising:
   an input interface configured to receive a request to perform a deduplication backup operation;
   a processor configured to:
   determine a backup operation queue, wherein the backup operation queue comprises a plurality of types of backup operations, and wherein at least one of the plurality of types of backup operations comprises the deduplication backup operation;
   determine whether the deduplication backup operation is at the head of the backup operation queue;
   in response to determining that the deduplication backup operation is at the head of the backup operation queue, determine whether the deduplication backup operation is qualified to be executed based at least in part on a backup system load, wherein the backup system load is determined based at least in part on one or more thresholds, and at least one of the one or more thresholds is associated with an input stream load, and the one or more thresholds comprise a processor load threshold, the processor load threshold being determined based at least in part on a deduplication backup operation type; and
   in response to determining that the deduplication backup operation is qualified to be executed, execute the deduplication backup operation.

2. The system of claim 1, wherein the deduplication backup operation comprises a maintenance operation.

3. The system of claim 1, wherein the deduplication backup operation comprises a storage operation.

4. The system of claim 1, wherein the deduplication backup operation comprises a recover operation.

5. The system of claim 1, wherein the processor is further configured to log the request to perform a deduplication backup operation.

6. The system of claim 1, wherein the processor is further configured to load the deduplication backup operation into the backup operation queue.

7. The system of claim 1, wherein determining whether the deduplication backup operation is qualified to be executed comprises checking one or more thresholds.

8. The system of claim 1, wherein executing the deduplication backup operation comprises communicating with the requesting system.

9. The system of claim 8, wherein communicating with the requesting system comprises requesting an input data stream.

10. The system of claim 8, wherein communicating with the requesting system comprises throttling an input data stream.

11. The system of claim 8, wherein communicating with the requesting system comprises providing a recovered file.

12. The system of claim 8, wherein communicating with the requesting system comprises indicating a maintenance operation is complete.

13. The system of claim 1, wherein the processor is further configured to log the execution of the deduplication backup operation.

14. The system of claim 1, wherein determining whether the deduplication backup operation is qualified comprises determining whether an input stream number is below an input stream threshold.

15. The system of claim 1, wherein determining whether the deduplication backup operation is qualified comprises determining whether a processor loading is below a processor threshold.

16. The system of claim 1, wherein determining whether the deduplication backup operation is qualified comprises determining whether a storage activity is below a storage threshold.

17. A method for queuing deduplication backup operations, comprising:
receiving a request to perform a deduplication backup operation;
determining a backup operation queue, wherein the backup operation queue comprises a plurality of types of backup operations, and wherein at least one of the plurality of types of backup operations comprises the deduplication backup operation;
determining whether the deduplication backup operation is at the head of the backup operation queue;
in response to determining that the deduplication operation is at the head of the backup operation queue, determining whether the deduplication backup operation is qualified to be executed, based at least in part on a backup system load, wherein the backup system load is determined based at least in part on one or more thresholds, and at least one of the one or more thresholds is associated with an input stream load, and the one or more thresholds comprise a processor load threshold, the processor load threshold being determined based at least in part on a deduplication backup operation type; and
in response to determining that the deduplication backup operation is qualified to be executed, executing the deduplication backup operation.

18. A computer program product for queuing deduplication backup operations, the computer program product being embodied in a tangible non-transitory computer readable storage medium and comprising computer instructions for:
receiving a request to perform a deduplication backup operation;
determining a backup operation queue, wherein the backup operation queue comprises a plurality of types of backup operations, and wherein at least one of the plurality of types of backup operations comprises the deduplication backup operation;
determining whether the deduplication backup operation is at the head of the backup operation queue;
in response to determining that the deduplication backup operation is at the head of the backup operation queue, determining whether the deduplication backup operation is qualified to be executed based at least in part on a backup system load, wherein the backup system load is determined based at least in part on one or more thresholds, and at least one of the one or more thresholds is associated with an input stream load, and the one or more thresholds comprise a processor load threshold, the processor load threshold being determined based at least in part on a deduplication backup operation type; and
in response to determining that the deduplication backup operation is qualified to be executed, executing the deduplication backup operation.

19. The system of claim 1, wherein the plurality of types of backup operations include backup storage operations, backup recovery operations, and backup maintenance operations.

20. The system of claim 19, wherein the plurality of types of backup operations are queued together.

21. The system of claim 1, wherein the backup system load is determined based at least in part on a current number of operations running.

22. The system of claim 1, wherein at least one of the one or more thresholds is a processor load threshold.

23. The system of claim 1, wherein a first deduplication backup operation type has a different processor load threshold than a second deduplication backup operation type.

24. The system of claim 21, wherein the current number of operations running is determined based at least in part on processing log information to count started operations that have not been completed.

25. The system of claim 1, wherein the processor is further configured to throttle a speed at which backup operations are obtained from the backup operation queue based on the backup system load.

26. The system of claim 1, wherein the processor is further configured to determine a point in the backup operation queue to which a backup operation is to be added based at least in part on a corresponding deduplication backup operation priority.

* * * * *